US007101009B2

(12) United States Patent
Kakutani

(10) Patent No.: US 7,101,009 B2
(45) Date of Patent: Sep. 5, 2006

(54) EJECTION CONTROL OF QUALITY-ENHANCING INK

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 241 days.

(21) Appl. No.: 10/877,754

(22) Filed: Jun. 25, 2004

(65) Prior Publication Data

US 2005/0185011 A1 Aug. 25, 2005

(30) Foreign Application Priority Data

Jun. 27, 2003 (JP) ............................. 2003-184557

(51) Int. Cl.
*B41J 2/205* (2006.01)
*G06K 1/00* (2006.01)

(52) U.S. Cl. ............................ 347/15; 358/1.9; 347/98

(58) Field of Classification Search .................. 347/15, 347/43, 98; 358/1.9, 3.01
See application file for complete search history.

(56) References Cited

U.S. PATENT DOCUMENTS 6,123,411 A * 9/2000 Inui et al. ..................... 347/43
6,158,834 A * 12/2000 Kato et al. ..................... 347/9

FOREIGN PATENT DOCUMENTS

| | | |
|---|---|---|
| JP | 04-152460 | 5/1992 |
| JP | 06-089056 | 3/1994 |
| JP | 08-060059 | 3/1996 |

OTHER PUBLICATIONS

Abstract of Japanese patent Publication No. 04-152460, Pub. Date: May 26, 1992, Patent Abstracts of Japan.
Abstract of Japanese Patent Publication No. 06-089056, Pub. Date: Mar. 29, 1994, Patent Abstracts of Japan.
Abstract of Japanese Patent Publication No. 08-060059, Pub. Date: Mar. 05, 1996, Patent Abstracts of Japan.

* cited by examiner

*Primary Examiner*—Lamson Nguyen
(74) *Attorney, Agent, or Firm*—Martine Penilla & Gencarella, LLP

(57) ABSTRACT

A printing control method of generating dot data representing a state of dot formation at each pixel in a printed image represented by an given image data, by formation of dots in respective pixels with the at least one colored ink and the quality-enhancing ink available in the print unit. This process includes a processing of setting a predetermined tone value to the tone value of the quality-enhancing ink when the pixel value is equal to the characteristic value.

8 Claims, 8 Drawing Sheets

EJECTION CONTROL OF QUALITY-ENHANCING INK

BACKGROUND OF THE INVENTION

1. Field of the Invention

The present invention relates to a printing technique of ejecting inks on a printing medium to print an image.

2. Description of the Related Art

Printers that eject inks from nozzles of a print head have widely been used as the output device of the computer. A quality-enhancing ink is typically used in such printers to improve the quality of resulting prints. The quality-enhancing ink improves the properties like color development, water resistance, and light stability, and prevention of a variation in gloss to attain the high picture quality of the resulting prints.

Ejection of the quality-enhancing ink may be demanded in a blank area consisting of blank pixels with no requirement of color development. The process of determining a required quantity of the quality-enhancing ink to be ejected in the blank area is undesirably time-consuming.

SUMMARY OF THE INVENTION

The object of the invention is thus to eliminate the drawbacks of the prior art technique and to provide a technique of shortening a total time required for a printing process with a quality-enhancing ink for improvement of the quality of a resulting print.

In order to attain the above objects of the present invention, there is provided a printing control method of generating print data to be supplied to a print unit to print. The print unit forms dots on a print medium by ejecting ink droplets of at least one type of colored ink containing a color material and a quality-enhancing ink for enhancing quality of a printed material. The printing control method comprises (a) converting a pixel value representing color of each pixel in given image data into tone values of individual inks to express the color of the pixel with the quality-enhancing ink and at least part of the colored inks available in the print unit; and (b) generating dot data representing a dot formation state of a colored dot formed with the at least one colored ink and a transparent dot formed with the quality-enhancing ink in each pixel, according to the tone values of the individual inks generated by the color conversion. The step (a) includes the step of determining whether the pixel value is equal to a characteristic value corresponding to a blank pixel where no colored dot is created, and setting a predetermined tone value to the tone value of the quality-enhancing ink when the pixel value is equal to the characteristic value, while converting the color conversion with reference to a color conversion table when the pixel value is other than the characteristic value. The color conversion table maps the pixel value to a combination of the tone values of the individual inks to express the color of the pixel with the at least part of the colored inks and with the quality-enhancing ink.

The print control method of the invention sets the predetermined tone value to the tone value of the quality-enhancing ink, based on the result of the determination whether the pixel value is equal to the characteristic value, with regard to the blank pixels where no colored dots are created. This method does not require the reference to the color conversion table for the blank pixels. This arrangement desirably saves the time required for the reference to the color conversion table with regard to a blank area consisting of blank pixels, thus advantageously shortening the total time required for the whole printing process.

Here the "printed material" represents any printed matter obtained by ejection of the colored inks and the quality-enhancing ink on the printing medium. The terminology 'quality-enhancing ink' means ink that improves the properties like color development, water resistance, and light stability and prevents a variation in gloss, so as to enhance the picture quality of the resulting print.

The technique of the invention is attained by a diversity of applications, for example, a printing apparatus, a print control method, and a computer program.

DESCRIPTION OF THE PREFERRED EMBODIMENTS

One mode of carrying out the invention is discussed below as a preferred embodiment in the following sequence:

A. Configuration of Apparatus

B. Print Data Generation Process in the Embodiment of the Invention

C. Modifications

A. Configuration of Apparatus

Figure 1:
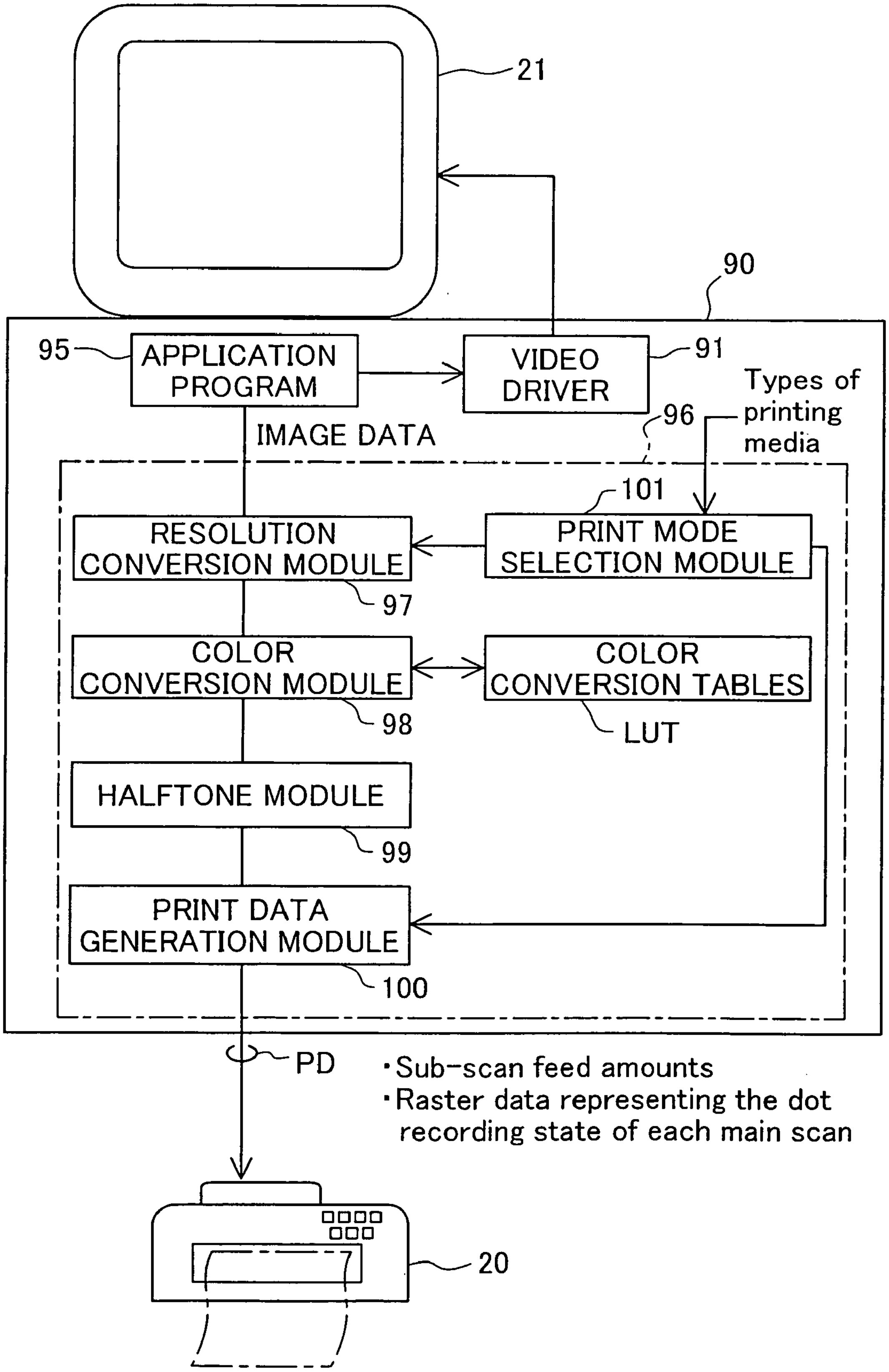
FIG. 1 is a block diagram illustrating the configuration of a printing system in one embodiment of the invention.

FIG. 1 is a block diagram schematically illustrating the configuration of a printing system in one embodiment of the invention. This printing system includes a computer 90 functioning as a printing control apparatus and a color printer 20 functioning as a print unit. The combination of the color printer 20 with the computer 90 is regarded as a "printing apparatus" in the broad sense.

Application program 95 operates on computer 90 under a specific operating system. A video driver 91 and a printer driver 96 are incorporated in the operating system. The application program 95 outputs image data, which goes through a series of image processing in the printer driver 96 and is given as print data PD to the color printer 20. The application program 95 also outputs image data to display a processed image on a CRT 21 via the video driver 91.

The printer driver 96 includes a resolution conversion module 97, a color conversion module 98, a color-quantizing module 99, a print data generation module 100, print mode selection module 101, multiple color conversion tables LUT, and a dot rate table DT. The functions of these constituents will be discussed later.

The printer driver 96 is equivalent to a program functioning to generate the print data PD. The program of attaining the functions of the printer driver 96 is supplied in the form recorded in a computer readable recording medium. Typical examples of such computer readable recording medium include flexible disks, CD-ROMs, magneto-optic disks, IC cards, ROM cartridges, punched cards, prints with barcodes or other codes printed thereon, internal storage devices (memories like RAM and ROM) and external storage devices of the computer, and a diversity of other computer readable media.

Figure 2:
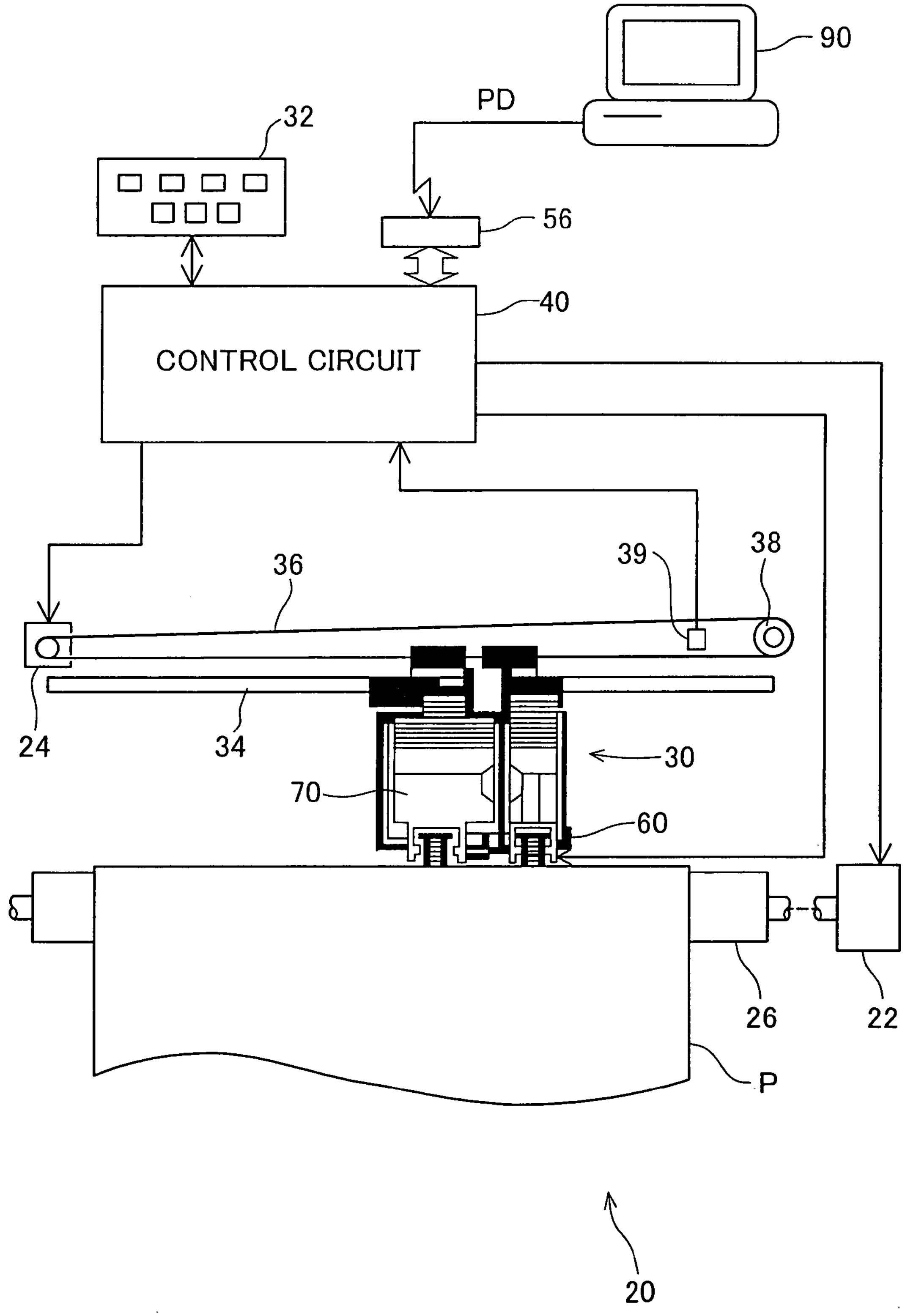
FIG. 2 schematically illustrates the structure of a color printer 20.

FIG. 2 schematically illustrates the structure of the color printer 20. The color printer 20 has a sub-scan drive unit that activates a paper feed motor 22 to feed a sheet of printing paper P in a sub-scanning direction, a main scan drive unit that activates a carriage motor 24 to move a carriage 30 back and forth in an axial direction of a paper feed roller 25 (in a main scanning direction), a head drive mechanism that drives a print head unit 60 (also called 'print head assembly') mounted on the carriage 30 to control ink ejection and dot formation, and a control circuit 40 that transmits signals to and from the paper feed motor 22, the carriage motor 24, the print head unit 60, and an operation panel 32. The control circuit 40 is connected to the computer 90 via a connector 56.

Figure 3:
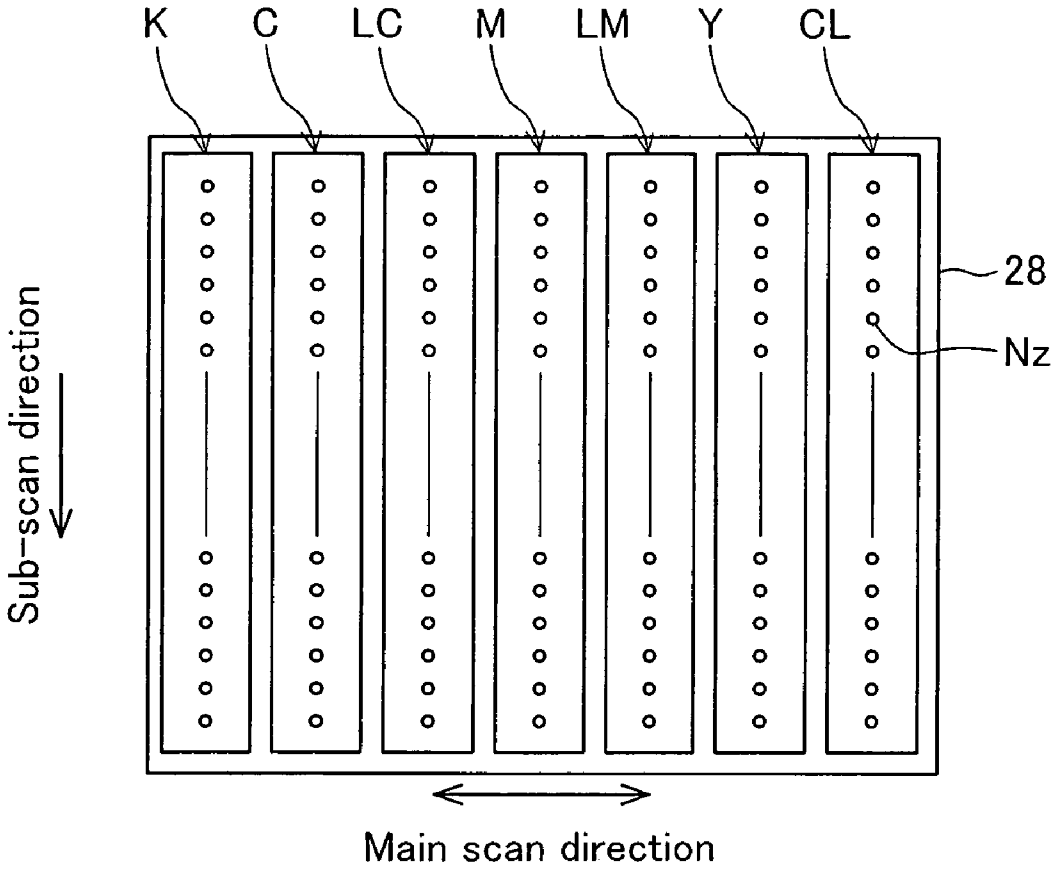
FIG. 3 shows nozzle arrays on a bottom face of a print head 28.

FIG. 3 shows an arrangement of nozzles Nz on the bottom face of the print head 28. Nozzle arrays for ejecting colored inks containing color materials and a quality-enhancing ink for enhancing quality of a printed material are formed on the bottom face of the print head 28. Black ink K, cyan ink C, light cyan ink LC, magenta ink M, light magenta ink LM, and yellow ink Y are used as the colored inks in this embodiment.

The colored inks are not limited to these six inks K, C, LC, M, LM, and Y but may be selected arbitrarily according to the desired picture quality of printed material images. For example, the four inks K, C, M, and Y may be used, or only the black ink K may be used. Dark yellow ink having the lower lightness than the yellow ink Y, gray ink having the higher lightness than the black ink K, blue ink, red ink, and green ink may be used in some combinations.

The quality-enhancing ink CL may be transparent and colorless ink having similar gloss to the other inks and enhancing the color development of the other inks. The quality-enhancing ink CL may be ink disclosed in Japanese Patent Laid-Open Gazette No. 8-60059. The quality-enhancing ink CL functions to reduce the variation in gloss and enhance the color development, thus improving the picture quality of the printed material. The quality-enhancing ink CL may otherwise be ink for enhancing the water resistance or the light resistance to improve the water resistance or the light resistance of printed material.

In the color printer 20 having the hardware structure discussed above, while the printing paper P is fed by the paper feed motor 22, the carriage 30 is moved back and forth by means of the carriage motor 24 and simultaneously piezoelectric elements on the print head 28 are actuated to eject ink droplets of the respective color inks and form ink dots of variable sizes (large, medium, small). This gives a multi-color, multi-tone image on the printing paper P.

B. Print Data Generation Process in the Embodiment of the Invention

Figure 4:
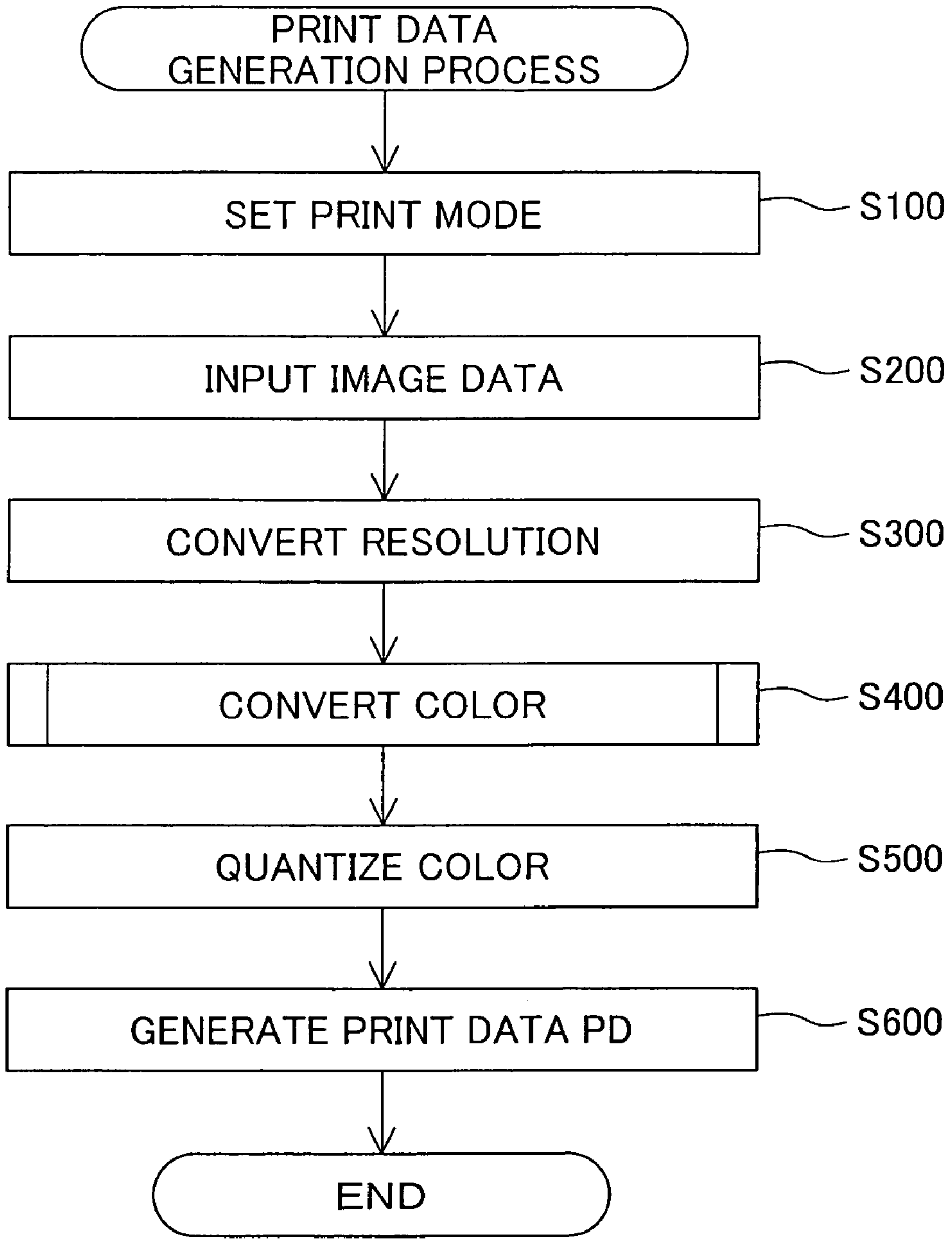
FIG. 4 is a flowchart showing a routine of print data generation process executed in the embodiment of the invention.

FIG. 4 is a flowchart showing a routine of print data generation process executed in the embodiment of the invention. The print data generation process is executed by the computer 90 to generate print data PD, which is to be supplied to the color printer 20.

At step S100, the user sets a print mode. Setting parameters of the print mode include the type of a printing medium selected. The user enters the type of the selected printing medium via a user interface (not shown), which is given by the print mode selection module 101 (see FIG. 1) to be displayed on the CRT 21. The available types of printing media include glossy paper and plain paper. The user's entries of the print mode parameters including the type of the printing medium are stored in the print mode selection module 101.

At step S200, the printer driver 96 (see FIG. 1) inputs image data from the application program 95. Input of the image data is triggered by a printing instruction from the application program 95. In this embodiment, the input image data is RGB image data.

At step S300, the resolution conversion module 97 converts the resolution (that is, the number of pixels per unit length) of the input RGB image data into a specific resolution. At subsequent step S400, the color conversion module 98 carries out a color conversion process.

Figure 5:
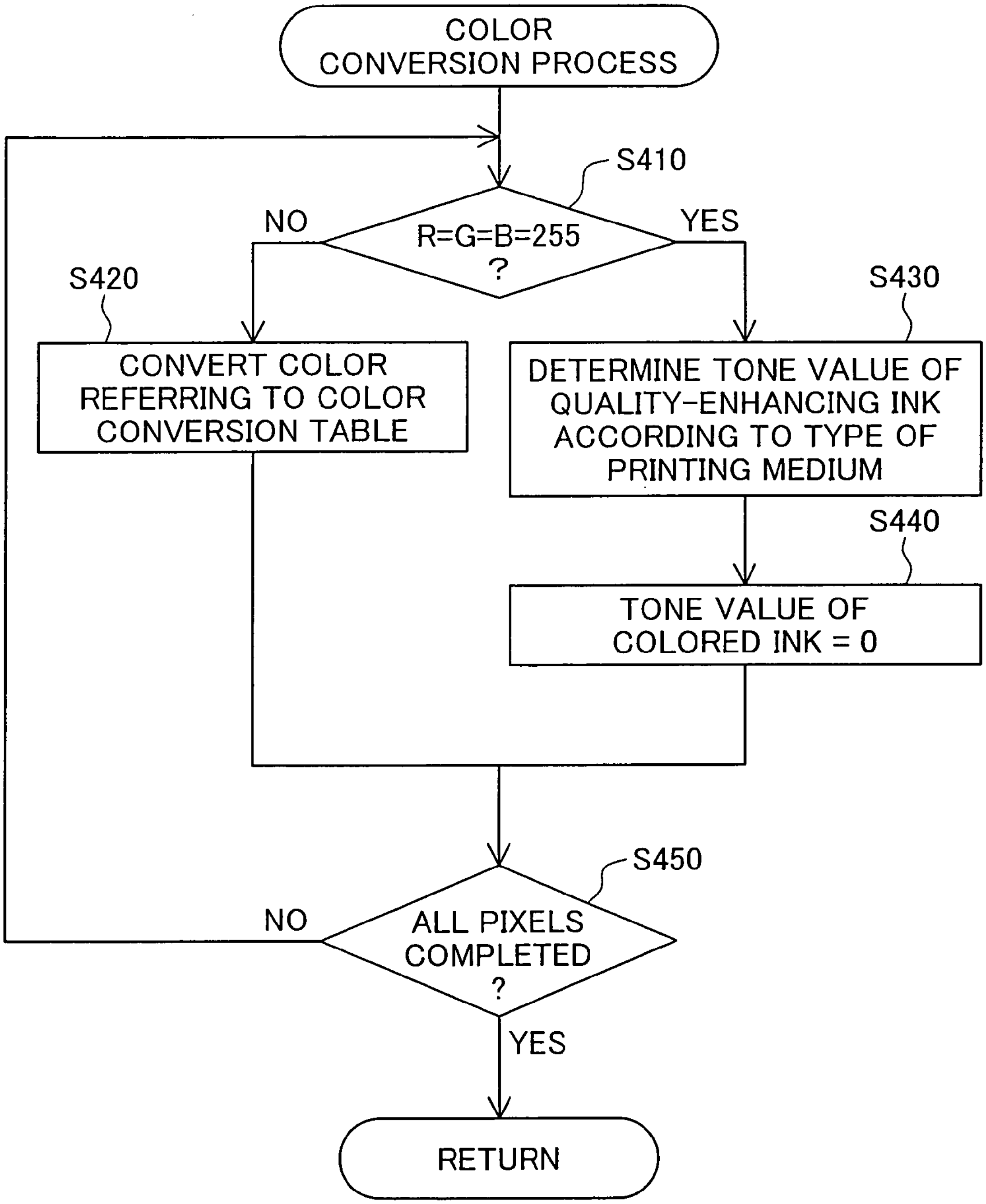
FIG. 5 is a flowchart showing the details of a color conversion process executed in the embodiment of the invention.

FIG. 5 is a flowchart showing the details of the color conversion process executed in the embodiment of the invention. At step S410, the color conversion module 98 determines whether pixel values of a target pixel are equal to characteristic values. Here the characteristic values correspond to a blank pixel where no colored dot is created. In this embodiment, the characteristic values are equal to 255 with regard to all the colors R, G, and B, that is, maximum R, G, and B values in a predetermined range. When the pixel values are equal to the characteristic values, the routine goes to step S430. When the pixel values are not equal to the characteristic values, on the other hand, the routine goes to step S420.

At step S420, the color conversion module 98 refers to a color conversion table LUT and converts the RGB image data into multi-tone data of the quality-enhancing ink and the colored inks available in the color printer 20. This conversion is carried out individually for the respective pixels.

Figure 6:
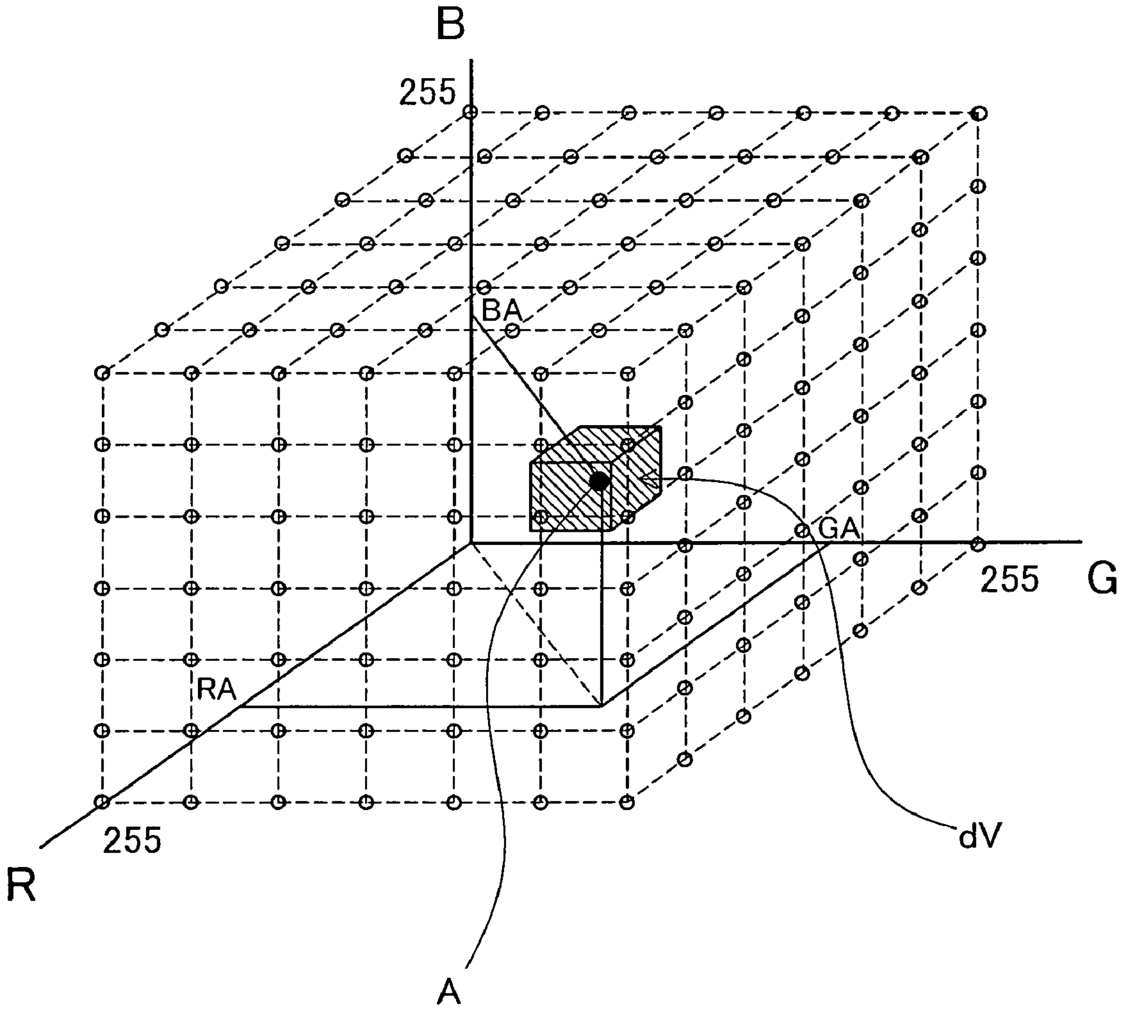
FIG. 6 shows a color conversion table used in the color conversion process in the embodiment of the invention.

FIG. 6 shows the color conversion table LUT used for the color conversion process executed in the embodiment of the invention. In the color conversion table LUT, the tone values of the respective colors R, G, and B are shown by three axes that are mutually perpendicular to one another, and the space defined by these three axes is divided into lattices. Each lattice point stores the tone values of the individual inks to express the color, which is defined by the tone values of R, G, and B, with the colored inks and the quality-enhancing ink.

The color conversion module 98 carries out the color conversion with reference to the color conversion table LUT. For example, when the respective tone values of R, G, and B in given image data are RA, GA, and BA, the process first extracts a cube dV including a point A that is expressed by coordinates (RA, GA, BA) on the color conversion table LUT. The cube dV is defined by 8 lattice points selected as vertexes to include the point A.

The color conversion module 98 reads the tone values of the colored inks (C, M, Y, K, LC, and LM) and the quality-enhancing ink CL stored at the eight lattice points. The color conversion module 98 then carries out interpolation of the retrieved tone values to calculate the tone values of the colored inks and the quality-enhancing ink CL at the point A. It is not required to store the tone values of all the colored inks available in the printer 20. The required storage of the tone values regards at least part of the colored inks (for example, C, M, Y, and K).

At step S430, the color conversion module 98 determines the tone value of the quality-enhancing ink according to the type of the printing medium. The determination depends upon the type of the printing medium, since the quantity of the quality-enhancing ink to be ejected in blank pixels varies according to the type of the printing medium. The data representing the type of the printing medium is provided from the print mode selection module 101.

The color conversion module 98 determines the tone value of the quality-enhancing ink to set the ejection quantity of ink equal to 30%, when the type of the printing medium is glossy paper. The tone value of the quality-enhancing is set equal to 0, when the type of the printing medium is plain paper. When the printing medium is glossy paper, ejection of the quality-enhancing ink in the blank area effectively eliminates a variation in gloss. When the printing medium is plain paper, on the other hand, ejection of the quality-enhancing ink and the colored inks in an overlapping manner advantageously reduces a variation in color development of the colored inks.

Figure 7A:
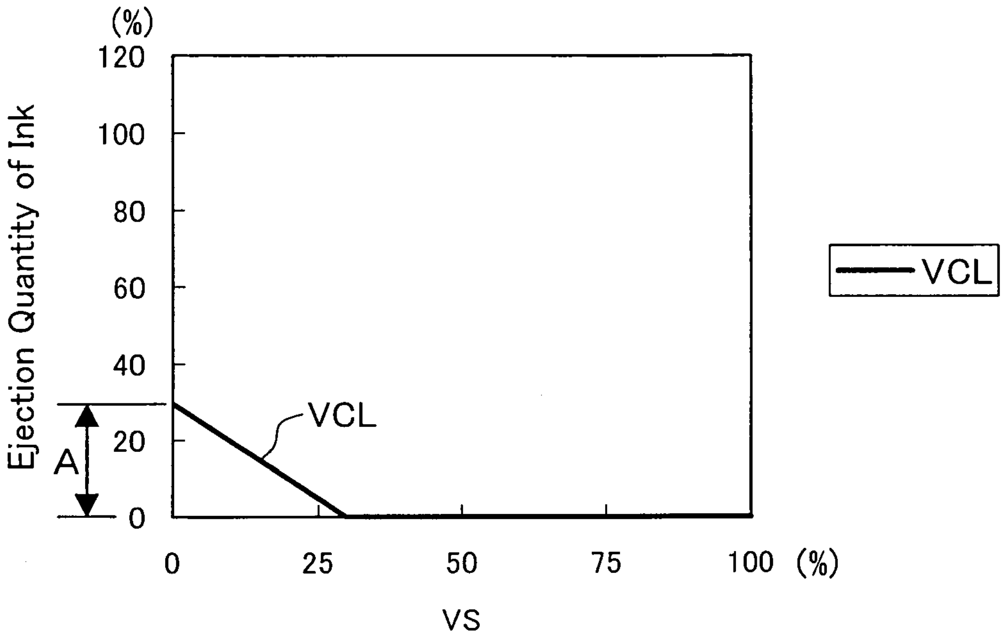
FIGS. 7(*a*) and 7(*b*) are graphs showing a variation in ejection quantity of colored ink and a variation in ejection quantity of quality-enhancing ink on a printing medium of glossy paper.
Figure 7B:
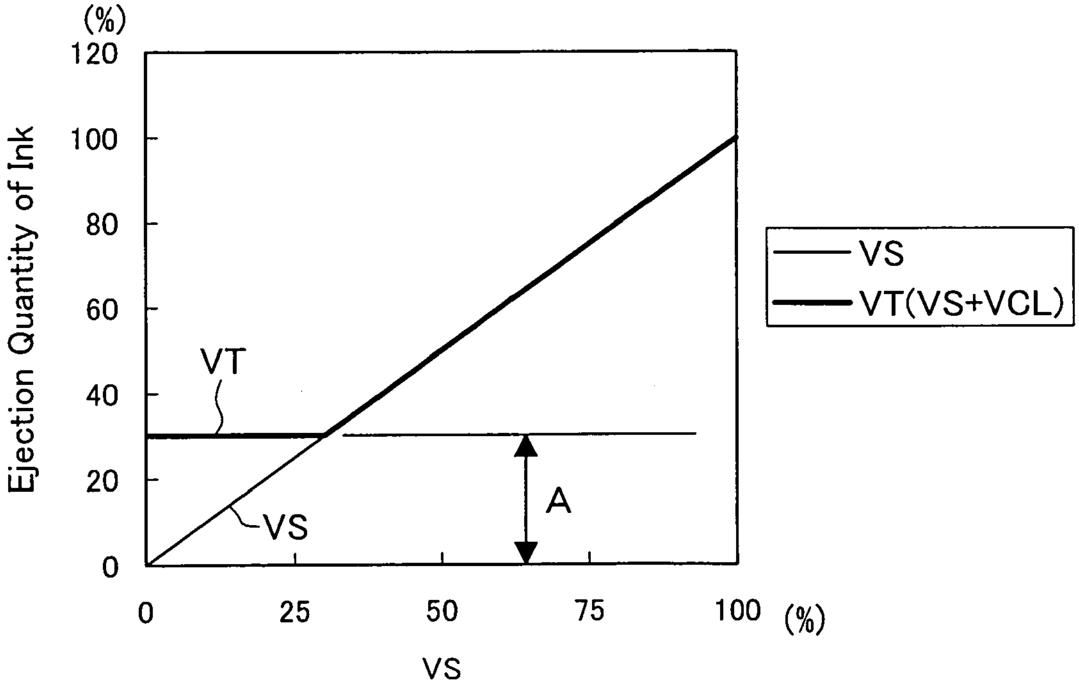

FIGS. 7(*a*) and 7(*b*) are graphs showing a variation in ejection quantity of the colored ink and a variation in ejection quantity of the quality-enhancing ink on a printing medium of glossy paper. FIG. 7(*a*) shows a variation in ejection quantity VCL of the quality-enhancing ink with a variation in ejection quantity VS of the colored ink. FIG. 7(*b*) shows a variation in total ejection quantity VT (=VS+VCL) of the colored ink and the quality-enhancing ink with a variation in ejection quantity VS of the colored ink. The abscissa represents the ejection quantity VS of the colored ink, whereas the ordinate represents the ejection quantity of the ink or inks shown in the respective explanatory notes.

As clearly understood from FIGS. 7(*a*) and 7(*b*), when the printing medium is glossy paper, the ejection quantity of the quality-enhancing ink is determined to ensure ejection of a large quantity of the quality-enhancing ink in a blank area where no colored inks are ejected. The area with the greater ejection quantity of the colored ink tends to have the higher gloss, in the case of printing on a printing medium with a relatively high gloss. Ejection of the greater quantity of the quality-enhancing ink in the blank pixels thus effectively eliminates a variation in gloss.

Figure 8A:
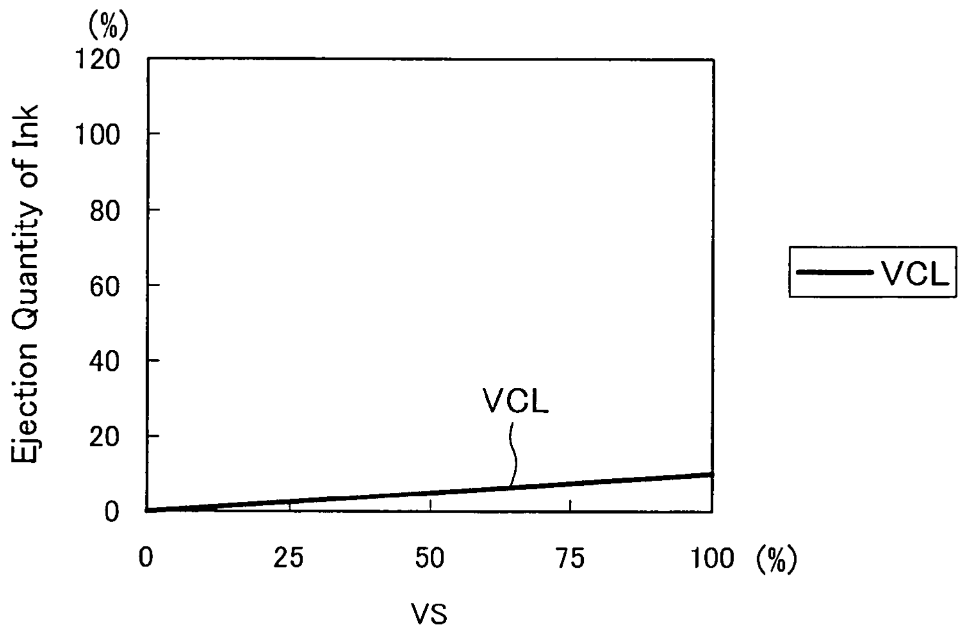
FIGS. 8(*a*) and 8(*b*) are graphs showing a variation in ejection quantity of the colored ink and a variation in ejection quantity of the quality-enhancing ink on a printing medium of plain paper or another printing paper having a relatively low gloss.
Figure 8B:
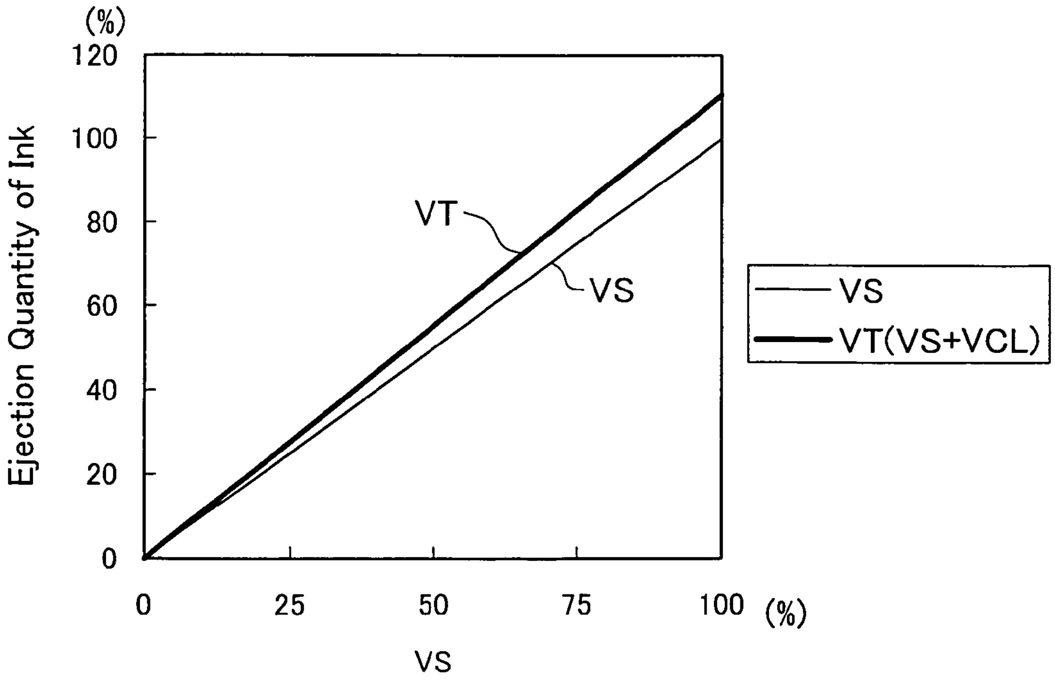

FIGS. 8(*a*) and 8(*b*) are graphs showing a variation in ejection quantity of colored ink and a variation in ejection quantity of quality-enhancing ink on a printing medium of plain paper or another printing paper having a relatively low gloss. The meaning of VS, VCL, and VT and the definition of the abscissa and the ordinate in the graphs of FIGS. 8(*a*) and 8(*b*) are identical with those in the graphs of FIGS. 7(*a*) and 7(*b*). Here the ejection quantity of the colored ink represents the total ejection quantity of all the available colored inks. When the respective colored inks have different variations in color development, the process may multiply the respective ejection quantities by different coefficients set for the individual inks as weights and calculate the total ejection quantity.

As clearly understood from FIGS. 8(*a*) and 8(*b*), the quality-enhancing ink is not ejected in blank pixels where no colored inks are ejected, while a large quantity of the quality-enhancing ink is ejected in an area having a large ejection quantity of the colored ink, in the case of printing on the printing medium of plain paper or another printing paper having a relatively low gloss. Such setting causes the quality-enhancing ink to be hit in an overlapping manner with the colored inks against the printing medium and prevents excessive ink absorption into the plain paper. This desirably prevents a variation in color development of the colored inks.

At step S440, the color conversion module 98 sets the value '0' to all the tone values of the colored inks. When the series of processing has been concluded for all the pixels (step S450), the processing goes to step S600 (see FIG. 4).

The processing of steps S430 and S440 may be omitted by setting the value '0' and 'a preset value corresponding to the type of the printing medium' respectively to all the default tone values of the colored inks and the default tone value of the quality-enhancing ink.

At step S600, the color-quantizing module 99 carries out a color subtraction process. The color subtraction process reduces 256 tones of the multi-tone data to, for example, 2 tones expressible in each pixel by the color printer 20. The 2 tones are expressed as 'dot off state' and 'dot on state' in this embodiment. Any of the error diffusion method, the density pattern method, and the systematic dither method may be applied for the color subtraction process.

At step S600, the print data generation module 100 rearranges the dot data representing the dot formation state of the respective pixels in an order of data to be transferred to the color printer 20 and outputs the rearranged dot data as final print data PD. The print data PD includes raster data representing the dot recording state of each main scan and data representing of sub-scan feed amounts.

The procedure of the embodiment determines the ejection quantity of the quality-enhancing ink according to only the type of the printing medium without referring to the color conversion table LUT, with regard to the blank pixels where no colored dots are created. This arrangement desirably saves the time required for the reference to the color conversion table LUT and thereby effectively shortens the total time required for the whole printing process.

C. Modifications

The embodiment discussed above is to be considered in all aspects as illustrative and not restrictive. There may be many modifications, changes, and alterations without departing from the scope or spirit of the main characteristics of the present invention. Some examples of possible modification are given below.

C-1. In the embodiment discussed above, the color conversion module determines the tone value of the quality-enhancing ink according to the type of the printing medium. The tone value of the quality-enhancing ink may be determined according to the type of the quality-enhancing ink or according to a combination of the type of the quality-enhancing ink with the type of the printing medium. In another possible modification, the color conversion module may be designed to uniformly give a fixed tone value of the quality-enhancing ink, regardless of the type of the printing medium or the type of the quality-enhancing ink.

C-2. In the embodiment discussed above, the type of the printing medium is identified by selection of the print mode. The type of the printing medium may automatically be identified by a specific means provided in the printing apparatus for automatic identification of the type of the printing medium.

The specific means for automatic identification of the type of the printing medium may be, for example, a light-based specification means to discriminatingly identify the reflected light on the basis of a difference in reflectance of light between special paper and plain paper, a barcode reading means to read a barcode attached to the recording medium or its packaging material for the identification, and a means to utilize an IC reader for the identification. The main advantage of such means is non-requirement of the user's manual operation for identification of the type of the printing medium. The advantage of selection of the print mode to identify the type of the printing medium is, on the other hand, the simplified structure.

C-3. In the embodiment discussed above, the given image data is expressed in the RGB color system. The image data may alternatively be expressed in another color system, for example, in a Lab color system.

C-4. The technique of the invention is not restricted to color printing but is also applicable to monochromatic printing. The technique is also applicable to a printing system that is capable of creating multiple dots in one pixel to express multiple tones.

C-5. In the respective embodiments discussed above, part of the hardware configuration may be replaced by the software, while part of the software configuration may be replaced by the hardware. For example, part or all of the functions of the printer driver 96 shown in FIG. 1 may be executed by the control circuit 40 included in the printer 20. In this modified structure, part or all of the functions of the computer 90 as the printing control apparatus of generating print data is attained by the control circuit 40 of the printer 20.

Part or all of the functions of the invention may be actualized by the software. In such cases, the software (computer programs) may be supplied in the form recorded in a computer readable recording medium. In the terminology of this invention, the 'computer readable recording medium' is not restricted to portable recording media like flexible disks and CD-ROMs but includes internal storage devices of the computer like various RAMs and ROMs and external storage devices fixed to the computer like hard disks.

Japanese Patent Application No. 2003-184557 (filed on Jun. 27, 2003) on the basis of the claim of priority of this application is incorporated herein by reference.

What is claimed is:

1. A printing control method of generating print data to be supplied to a print unit to print, the print unit forming dots on a print medium by ejecting ink droplets of at least one type of colored ink containing a color material and a quality-enhancing ink for enhancing quality of a printed material, the printing control method comprising:

(a) converting a pixel value representing color of each pixel in given image data into tone values of individual inks to express the color of the pixel with the quality-enhancing ink and at least part of the colored inks available in the print unit; and (b) generating dot data representing a dot formation state of a colored dot formed with the at least one colored ink and a transparent dot formed with the quality-enhancing ink in each pixel, according to the tone values of the individual inks generated by the color conversion, wherein the step (a) includes the step of determining whether the pixel value is equal to a characteristic value corresponding to a blank pixel where no colored dot is created, and setting a predetermined tone value to the tone value of the quality-enhancing ink when the pixel value is equal to the characteristic value, while converting the color conversion with reference to a color conversion table when the pixel value is other than the characteristic value, and the color conversion table maps the pixel value to a combination of the tone values of the individual inks to express the color of the pixel with the at least part of the colored inks and with the quality-enhancing ink.

2. The print control method in accordance with claim 1, wherein the given image data is expressed by an RGB color system, and the characteristic value gives maximum RGB values in a predetermined range.

3. The print control method in accordance with claim 1, wherein the step (a) further comprises the step of determining the tone value of the quality-enhancing ink according to type of the printing medium, when the pixel value is equal to the characteristic value.

4. The print control method in accordance with claim 1, wherein the step (a) further comprises the step of determining the tone value of the quality-enhancing ink according to type of the quality-enhancing ink, when the pixel value is equal to the characteristic value.

5. A printing method of forming dots on a printing medium to implement printing, the printing method comprising the steps of:

(a) providing a print unit capable of ejecting at least one type of colored ink containing a color material and a quality-enhancing ink for enhancing quality of a printed material, on the printing medium to form dots;

(b) converting a pixel value representing color of each pixel in given image data into tone values of individual inks to express the color of the pixel with the quality-enhancing ink and at least part of the colored inks available in the print unit; and (c) generating dot data representing a dot formation state of a colored dot formed with the at least one colored ink and a transparent dot formed with the quality-enhancing ink in each pixel, according to the tone values of the individual inks generated by the color conversion, wherein the step (a) includes the step of providing a color conversion table that maps the pixel value to a combination of the tone values of the individual inks to express the color of the pixel with the at least part of the colored inks and with the quality-enhancing ink, and the step (b) includes the step of determining whether the pixel value is equal to a characteristic value corresponding to a blank pixel where no colored dot is created, and setting a predetermined tone value to the tone value of the quality-enhancing ink when the pixel value is equal to the characteristic value, while converting the color conversion with reference to a color conversion table when the pixel value is other than the characteristic value.

6. A printing control apparatus for generating print data to be supplied to a print unit to print, the print unit forming dots on a print medium by ejecting ink droplets of at least one type of colored ink containing a color material and a quality-enhancing ink for enhancing quality of a printed material, the printing control apparatus comprising:

a color converter configured to convert a pixel value representing color of each pixel in given image data into tone values of individual inks to express the color of the pixel with the quality-enhancing ink and at least part of the colored inks available in the print unit; and a dot data generator configured to generate dot data representing a dot formation state of a colored dot formed with the at least one colored ink and a transparent dot formed with the quality-enhancing ink in each pixel, according to the tone values of the individual inks generated by the color conversion, wherein the color converter determines whether the pixel value is equal to a characteristic value corresponding to a blank pixel where no colored dot is created, and setting a predetermined tone value to the tone value of the quality-enhancing ink when the pixel value is equal to the characteristic value, while converting the color conversion with reference to a color conversion table when the pixel value is other than the characteristic value, and the color conversion table maps the pixel value to a combination of the tone values of the individual inks to express the color of the pixel with the at least part of the colored inks and with the quality-enhancing ink.

7. A printing apparatus for forming dots on a printing medium to print an image, the printing apparatus comprising:

a print unit configured to eject at least one type of colored ink containing a color material and a quality-enhancing ink for enhancing quality of a printed material, on the printing medium to form dots;

a color converter configured to convert a pixel value representing color of each pixel in given image data into tone values of individual inks to express the color of the pixel with the quality-enhancing ink and at least part of the colored inks available in the print unit; and a dot data generator configured to generate dot data representing a dot formation state of a colored dot formed with the at least one colored ink and a transparent dot formed with the quality-enhancing ink in each pixel, according to the tone values of the individual inks generated by the color conversion, wherein the color converter determines whether the pixel value is equal to a characteristic value corresponding to a blank pixel where no colored dot is created, and setting a predetermined tone value to the tone value of the quality-enhancing ink when the pixel value is equal to the characteristic value, while converting the color conversion with reference to a color conversion table when the pixel value is other than the characteristic value, and the color conversion table maps the pixel value to a combination of the tone values of the individual inks to express the color of the pixel with the at least part of the colored inks and with the quality-enhancing ink.

8. A computer program product for causing a computer to generate print data to be supplied to a print unit to print, the print unit forming dots on a print medium by ejecting ink droplets of at least one type of colored ink containing a color material and a quality-enhancing ink for enhancing quality of a printed material, wherein, the computer program product comprising:

a computer readable medium; and a computer program stored on the computer readable medium, the computer program comprising:

a first program for causing the computer to convert a pixel value representing color of each pixel in given image data into tone values of individual inks to express the color of the pixel with the quality-enhancing ink and at least part of the colored inks available in the print unit; and a second program for causing the computer to generate dot data representing a dot formation state of a colored dot formed with the at least one colored ink and a transparent dot formed with the quality-enhancing ink in each pixel, according to the tone values of the individual inks generated by the color conversion, wherein the first program includes a program for causing the computer to determine whether the pixel value is equal to a characteristic value corresponding to a blank pixel where no colored dot is created, and setting a predetermined tone value to the tone value of the quality-enhancing ink when the pixel value is equal to the characteristic value, while converting the color conversion with reference to a color conversion table when the pixel value is other than the characteristic value, and the color conversion table maps the pixel value to a combination of the tone values of the individual inks to express the color of the pixel with the at least part of the colored inks and with the quality-enhancing ink.

* * * * *